April 27, 1965     O. MOKLEBUST     3,180,631
INTEGRATED CHARRING AND ORE REDUCTION APPARATUS
Filed June 27, 1963
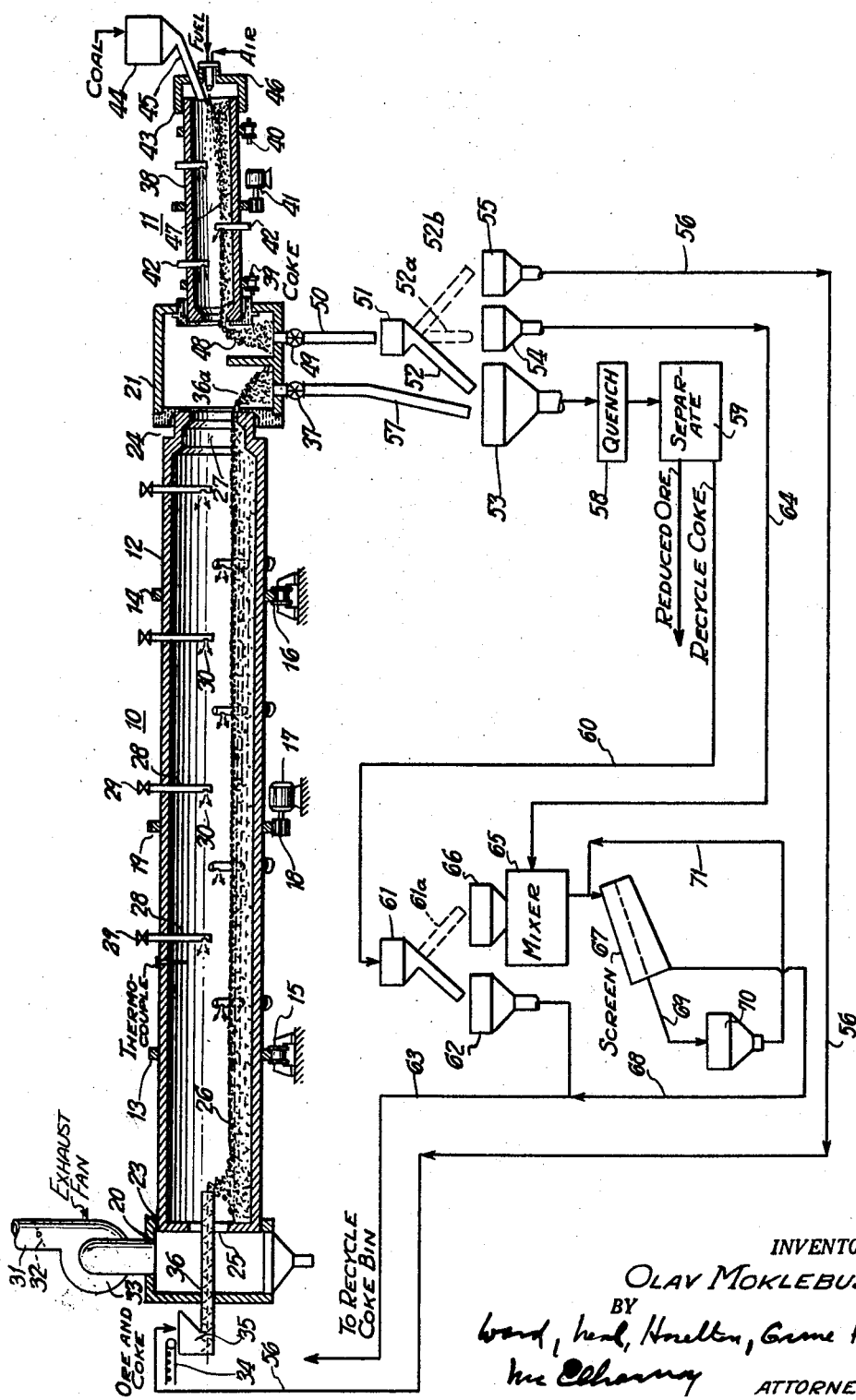
INVENTOR.
OLAV MOKLEBUST.
BY
ATTORNEYS.

3,180,631
INTEGRATED CHARRING AND ORE
REDUCTION APPARATUS
Olav Moklebust, Bayside, N.Y., assignor to R-N Corporation, New York, N.Y., a corporation of Delaware
Filed June 27, 1963, Ser. No. 290,982
4 Claims. (Cl. 263—32)

This invention pertains to the solid state reduction of oxidic ores, such as oxidic iron ores and the like, in the presence of hot combustible gases and a low volatile, solid carbonaceous reductant, and provides novel methods and apparatus therefor wherein the physical heat values as well as the chemical heat values of the hot combustible gases and the hot char resulting from the charring of a relatively high volatile carbonaceous material, such as coal, by partial combustion thereof, are utilized in reduction of the ore.

In processes as heretofore practiced using solid, carbonaceous reducing agents for low temperature, solid state ore reduction, ore and carbonaceous matter are usually mixed and heated up to reaction temperature. As the reaction temperatures are generally higher than the temperatures required for volatilization of the low volatile constituents contained in the reducing agent, these volatiles are usually lost to the process proper. Because the ore-carbon mixtures are heated up in counter current to the direction of gas flow, the volatile matter is distilled off at a temperature where its combustion is not needed and where its reducing power is not effective due to the low temperature. In these processes, therefore, the volatile matter can only be utilized outside the reactor, for instance, by combustion for external heating purposes. Thus, most of the solid reductant processes prefer to use coke, coke breeze or low volatile anthracites rather than high volatile coals. However, in visualizing large commercial installations, the availablity of low cost coke or coke breeze in sufficient quantities presents a serious problem, whereas coal is widely available at a relatively low cost.

Coal may be employed as the immediately available source of the solid reductant, by charring the same, and concurrently reducing the ore in the presence of the hot combustible gases and optionally also the low volatile, hot char resulting from the charring process. Alternatively, the hot char may be admixed with the wet recycle solid reductant, separated from the reduced ore product in continuous reduction processes, thereby to provide the necessary physical heat to dry the recycle reductant and supply a low volatile make-up char to offset that lost in the process. In this way the physical heat values of the hot char gas and char as well as the chemical heat values thereof are utilized in reducing the ore.

In accordance with one aspect of my invention, I have devised an integrated coal charring and ore reduction method and apparatus which utilizes the same operating techniques for both, thereby simplifying the overall operation and eliminating the necessity for a special charring operation crew.

The novel apparatus of my inveniton is of a composite duo-rotary kiln construction, comprising a relatively small rotary charring kiln and a larger rotary ore reduction kiln, the delivery ends of which terminate in a stationary housing, common to the two, and the feed ends of which are separately housed in stationary housings individual thereto. The feed end housings are, respectively, provided with means for feeding crushed ore and the solid reductant together with a fluxing agent such as limestone or dolomite, if required, into the feed end of the ore reduction kiln and crushed coal or an equivalent high volatile, solid carbonaceous reductant into the feed end of the charring kiln. The reduction kiln is provided at its feed end with a stack containing a blower and damper for regulating the draft. The hot combustible gases evolved in the charring kiln pass directly through the common delivery end housing into the reduction kiln. This housing is also provided with means for separately discharging the hot reduced ore product and the hot char delivered from the ore reduction and charring kilns, respectively. For initial heating of the charring kiln, a burner is provided at its feed end.

Both kilns are preferably constructed and operated in accordance with the principles set forth in my United States Patent 2,829,042, the rotary kiln construction of which employs a series of air inlet tubes penetrating the rotary kiln wall at intervals therealong and thereabout, these tubes extending to the kiln axis on the interior and being provided with outlets therein for directing the air flow axially of the kiln, and being provided exteriorly of the kiln with air inlet valves for adjustably regulating the temperature and combustion conditions throughout the kiln to provide optimum conditions of furnace performance.

In accordance with the novel process of my invention utilizing the aforesaid apparatus, the coal to be charred is crushed to approximately the size of char required for ore reduction in the ore reduction kiln. The so-crushed coal is fed continuously and progressively into the rotary charring kiln. Initial heating of the charring kiln is provided by the burner mounted at the feed end for introduction and ignition of an air-fuel mixture. As the coal passes progressively through the charring kiln, it is heated up and charred, the necessary heat for maintaining the operation being thereafter supplied by combusting a portion of the coal or combustible gases evolved therefrom. The necessary air for accomplishing this is drawn into the charring kiln through the air inlet tubes thereof, by the forced draft provided by the stack blower in the ore reduction kiln. The hot combustible gases generated in the charring kiln flow directly into the ore reduction kiln through the common housing, in which as above stated, the delivery end of the charring kiln terminates. Thus the physical as well as the chemical heat values of the hot char gases are utilized in the ore reduction process.

The hot char delivered from the charring kiln may be conveyed directly to the feed end of the ore reduction kiln and fed therein along with the ore and recycle char, and lime or other fluxing agent if employed, thereby to preheat the same and thus expedite the ore reduction. Alternatively, the hot char may be admixed with the wet recycle char, separated from the reduced ore product delivered from the ore reduction kiln, thereby to dry the same, and provide the necessary low volatile make-up char. As a further alternative, the hot char from the charring kiln may be fed together with the reduced ore product of the reduction kiln into the cooling, quenching and separating sequences, for providing clean recycle char where a low grade or contaminated coal is employed for charring.

The use in the process of my invention of such a rotary kiln for charring in conjunction with such a rotary kiln for ore reduction, has unique and commercially controlling advantages for reasons above stated, and also in that the two kilns are operated as a unit by a single operating crew. A further advantage is that no restrictions as to quality or particle size are imposed with respect to the coal or other high volatile reductant to be charred, as compared to such alternatives as fluidized bed or vibrating grate charring techniques. The latter are applicable only to the charring of relatively high grade coals, which must be pre-crushed and screened to relatively specific particle sizes, i.e., about 1 to 1.5 inches for a vibrating grate furnace, or alternatively such as will pass 100% through a ¼ inch screen in the case of the fluidized bed operation.

The charring kiln of my invention is operated at a rate of char and char gas production such in relation to the rate of ore reduction in the reduction kiln, as to provide hot char and hot char gases at production rates such as to meet the requirements therefor of the ore reduction kiln.

Having thus described the invention in general terms, reference will now be had for a more detailed description, to the accompanying drawing, which shows diagrammatically and schematically the essential construction and flow diagram operation of a preferred embodiment for practicing the invention.

Referring to the drawing, the rotary ore reduction and charring kilns are shown generally at 10 and 11, respectively. The ore reduction kiln comprises an elongated tubular kiln 12, suitably lined and provided with a pair of spaced bearing rings 13, 14, encircling the same, for rotatably supporting the kiln in axially inclined relation as shown, on rollers journaled to bearing supports, as at 15, 16. The kiln is rotated by a motor 17, to the shaft of which is keyed a pinion 18, meshing with a ring gear 19, mounted on te kiln and extending thereabout.

Disposed at the opposite ends of the rotary kiln 12, are stationary housings 20, 21, comprising, respectively, a feed end housing at the feed end, and a delivery end housing. Both ends are equipped with fluid-tight, water cooled seals between the rotary kiln and housings as at 23, 24.

At the feed end is located an apertured barrier 25 which permits the kiln to be operated with a high kiln load 26, without back spillage and with a maximum exit gas opening for the kiln gases. At the delivery end, the kiln 12 terminates in a retaining dam 27 for the kiln load, insuring a relatively deep bed depth in this part of the kiln. Also in the rotary kiln 12, are mounted at longitudinally and radially spaced intervals, a series of air inlet tubes, as at 28, which extend from the exterior to the axis thereof. The exterior ends of these tubes are fitted with manually or otherwise individually controlled, air inlet valves, as at 29, while the inner ends are provided with openings which are directed co-directional with the flow of gases in the kiln, as at 30, for controlling the temperature and combustion conditions throughout the kiln, as described in my patent aforesaid. The feed end housing 20 is connected to a stack 31, mounting therein a damper 32, and a blower or fan 33, for controlling the draft in the kiln.

Also at the feed end, surge bins (not shown) are provided for storage of ore, limestone, fresh coke and recycle coke, respectively, the discharge from which are fed by a belt conveyor 34, into a hopper 35, and thence by a screw conveyor 36 into the kiln 12. At the delivery end, the reduced ore product 36a, discharged from the kiln, is delivered into the housing 21, and is discharged thence through a gas-sealed outlet, such as suitably cooled rotary star valve, as at 37, for providing a relatively gas-tight discharge outlet.

The construction of the charring kiln 11 is substantially like that of the ore reduction kiln 10, and hence requires little comment. The rotary kiln unit 38, is rotatably mounted, as at 39, 40, in the same manner as kiln 12, above described, and is similarly motor driven, as at 41. Air inlet tubes are provided, as at 42, for the same purpose as tubes 28.

The rotary kiln 38 extends between a stationary feed end housing 43, and the common delivery end housing 21, as shown, being provided thereat with water cooled seals between the kiln and housings, the same as for kiln 12, as above described.

At the feed end, the charring kiln 11, is provided with a hopper 44, into which the crushed coal is delivered, and discharged thence through a screw or gravity conveyor 45, into the rotary kiln 38. For initial heating of the kiln 11, a burner 46 is mounted in the feed end housing 43, through which an air-gas mixture is supplied and burned within the kiln. Thereafter the necessary heat for charring the coal is supplied by combusting part of the volatiles evolved from the hot bed 47 of coal and char within the kiln. The necessary air stream for charring the coal is drawn into the charring kiln through the air inlet tubes 42, by the draft provided by the stack blower 33 of the ore reduction kiln, as a result of which the hot char gases generated in the charring kiln 38 will flow directly into the ore reduction kiln 12, through chamber 21 into which both of these tubes extend in open-ended manner as shown. The hot char passes out of the charring kiln 38 into the chamber 21, as at 48, and is discharged thence through a hopper containing a rotary star valve, as at 49.

The hot char from the charring kiln may be utilized in any of the ways above described. Thus, as illustrated purely by way of alternative routing in the drawing, but not by way of limitation to any particular apparatus employed, the hot char may, for example, be delivered by gravity feed from hopper 49 into a chute 50 and thence into a hopper 51, which may be rotated to discharge the hot char through the slanted hopper outlet 52 thereof, into any of hoppers 53, 54, 55, depending on the position to which the outlet 52 is rotated, as at 52, 52a, 52b.

If the hot char is thus delivered into hopper 55, it is conveyed thence over a suitable conveying system indicated schematically at 56, directly into the hopper 35, at the feed end of the ore reduction kiln 10, along with the ore, recycle coke, and lime if the latter is employed, thus to preheat the input charge to the furnace and thereby expedite the ore reduction, and also to replace the char consumed in the ore reduction.

If, on the other hand, the coal used for charring is contaminated or "dirty," it may be discharged from hopper 51 into hopper 53, into which the reduced ore product discharged from the reduction kiln, is also delivered via chute 57, and the admixture cooled directly by discharging thence into a quenching tank 58, or alternatively is cooled indirectly by feeding through an externally cooled drum, and conveyed thence into a conventional separating apparatus 59, including screening, magnetic separation and tabling, for removing the ash and separating the iron values from the recycle coke or char. The latter is conveyed thence as indicated schematically at 60, into a rotatable hopper 61, similar to hopper 51, from whence it is discharged into a hopper 62 by appropriate rotation of hopper 51 as indicated, and conveyed thence, as indicated at 63, into the recycle coke or char bin at the feed end of the ore reduction kiln 10.

As a final alternative, the char from kiln 11, if it is of good quality, may be discharged from hopper 52 into hopper 54, and conveyed thence, as indicated at 64, into a mixer 65, into which the recycle coke from the separator 59 is also discharged by positioning hopper 61, as indicated at 61a, to discharge into hopper 66, which in turn discharges into the mixer 65 as shown.

In the mixer 65, the physical heat of the hot char dries and preheats the wet, recycle coke or char, or preheats the same if introduced in a dry state, from whence the preheated and blended mixture is discharged onto a screen 67, the fines through which are conveyed, as indicated at 68, and thence as indicated at 63, to the recycle coke bin; while the oversize material, held on the screen, is delivered as indicated at 69, into a grinder 70, and returned to the screen for re-sieving, as indicated at 71.

It will be seen from the foregoing description that the invention provides a process and apparatus for integrated ore reduction and charring which is of universal application to the charring of all grades of carbonaceous raw materials and to the utilization of the resulting hot char and hot char gases in the ore reduction process, and this irrespective of the character and amount of the volatiles and tarry constituents present in the carbonaceous raw material, and also irrespective of the charring temperature and duration of the charring cycle required for charring the same to any desired low state of volatility, to the end of full and complete utilization in the ore reduction process of the sensible heat values of the resulting hot char and the hot char gases evolved. The charring temperature may of course be adjusted to and maintained at any value required by controlling the partial combustion of the carbonaceous raw material in accordance with the controlled air intake through the air tubes. The duration of the charring cycle may be adjusted by controlling the feed rate of the carbonaceous raw material through the charring kiln and also by the speed of kiln rotation.

In this connection it is to be pointed out that all high volatile, carbonaceous reductants go through the following cycle on charring. As the material is heated up, the light volatiles, such as hydrogen, methane, etc., are first evolved. As the temperature is further increased beyond the evolution of these constituents, the material softens due to liquefaction of the heavier volatiles, such as the tars. To evolve these, the softening stage must be followed by a baking period of substantial duration, if the structure of the remaining solid carbonaceous char is not to be destroyed, i.e., particle size, porosity, strength, etc.

In the process of this invention, in which the charring is effected by feeding the reductant progressively through a rotary kiln, while combusting a portion thereof under controlled conditions by introduction of air through the inlet tubes penetrating the kiln wall at intervals therealong, the material is gradually heated up as it travels along the kiln, thus initially to evolve the light volatiles as the temperature for evolving the same is reached, following which with further progression of the material along the kiln, a higher temperature is obtained such as to liquefy the heavier volatiles, with resulting softening of the char, while following this the material is subjected to the required prolonged baking in the remainder of the furnace to evolve the heavier volatiles and thereby discharge at the delivery end of the kiln, a strong, porous char of desired particle size, which has been freed of volatiles to any desired degree.

Many coals or other high volatile carbonaceous raw materials, require prolonged heating at temperatures as high as about 1900–2200° F. for effective charring to a low state of volatility, temperatures which are easily obtainable in applicant's process wherein any desired degree of heating for charring can be obtained by regulating the fraction of the coal or other carbonaceous raw material, which is burned for charring the remainder.

It is also to be noted that in the charring process of this invention, a portion of the sulphur which is inevitably present in the coal or other carbonaceous raw material, passes off in gaseous form in the charring kiln and is thus effectively eliminated from the system, so that the resulting char freed therefrom does not contaminate the iron of the ore reduction process.

Also with the process hereof, the rate of char and char gas production is adjustable to meet the full requirements therefor of the ore reduction kiln, and without excess or deficiency, this being accomplished by adjusting the rate of combustion of the high volatile reductant in the charring kiln in accordance with the char and char gas requirements of the ore reduction process. The ratio of char to char gas obtained may be adjusted to meet the requirements for each in the ore reduction process by appropriate selection of the carbonaceous raw material or by appropriate blending of such materials from different sources, as for example by blending a high volatile raw material with one of low volatility.

Another advantage of the construction operation of this invention is, referring to FIG. 1, that there is no sudden or precipitous change in gas pressure in passing from the charring kiln 11 into the ore reduction kiln 10, as would be the case for example if the charring were effected in a vibrating grate or other conventional type of charring apparatus. A vibrating grate or equivalent charring unit must be operated at a positive gas pressure within the hood in which the char gases are evolved and collected in order to prevent the inspiration of air thereinto with resulting combustion of some of the char gases. Since the ore reduction kiln of this invention operates in general at a negative gas pressure that is sub-atmospheric, the use of a vibrating grate charring kiln would necessitate piping the hot char gases from the charring unit into the reduction kiln through a conduit of dimensions appropriate to produce the required gas pressure differential in passing from one to the other. In contrast to this in the construction hereof, employing rotary charring and ore reduction kilns, each provided with valve controlled, spaced air tubes for controlling gas pressure as well as combustion conditions, the charring kiln may open directly into the ore reduction kiln as shown, so that the single exhaust fan provided in the exhaust stack of the reduction kiln draws the combustion gases as evolved in the charring kiln for combustion in the latter to provide the necessary temperature and combustion conditions for optimum reduction of the ore. In this connection the air intake through the valve inlet tubes of the charring kiln are adjusted for optimum charring conditions while the air intake through the air tubes of the reduction kiln are adjusted for optimum ore reduction conditions, so that optimum charring and ore reduction conditions are obtained automatically in this way.

This application is a continuation-in-part of my copending application Serial No. 80,296, filed January 3, 1961, now U.S. Patent No. 3,133,812, granted May 12, 1964.

What is claimed is:

1. Rotary kiln apparatus comprising: a pair of tubular kilns, means mounting each kiln for rotation about its axis, with an end of one kiln disposed adjacent an end of the other, a stationary housing common to said adjacent kiln ends, and spanning and encircling the same, stationary end housings individual to the opposite ends of said kilns and enclosing said ends, respectively, a stack containing blower and damper units surmounting one said end housing, means individual to said end housings for feeding loose aggregate materials into said kilns, respectively, means for discharging loose aggregate materials from the adjacent ends of said kilns into said common housing and separately discharging the same therefrom.

2. Rotary kiln apparatus comprising: a pair of tubular kilns, means mounting each kiln for rotation about its axis, with an end of one kiln disposed adjacent an end of the other, a stationary housing common to said adjacent kiln ends, and spanning and encircling the same, stationary end housings individual to the opposite ends of said kilns and enclosing said ends, respectively, a stack containing blower and damper units surmounting one said end housing, means individual to said end housings for feeding loose aggregate materials into said kilns, respectively, means for discharging loose aggregate materials from the adjacent ends of said kilns into said common housing and for separately discharging the same therefrom, gas inlet tubes penetrating each said kiln at spaced points therealong, said tubes having valve control means individual thereto, exterior to said kiln.

3. Integrated ore reduction and charring apparatus, comprising: a pair of tubular kilns, consisting of a relatively small charring kiln and a relatively large ore reduction kiln, means mounting each kiln in axially inclined relation for rotation about said axis, with the lower ends of the kilns disposed adjacent to one another, a stationary housing common to said adjacent kiln ends and spanning and encircling the same in substantially gas-sealed relation, stationary end housings individual to the opposite ends of said kilns and enclosing the same in substantially gas-sealed relation, means individual to said end housings for feeding loose aggregate materials therethrough and into the upper ends of said kilns, respectively, a stack including blower and damper units surmounting the end housing of said ore reduction kiln, means for discharging loose aggregate materials from the lower ends of said kilns into said common housing, and for separately discharging the same therefrom, respectively.

4. Integrated ore reduction and charring apparatus, comprising: a pair of tubular kilns consisting of a relatively small charring kiln and a relatively large ore reduction kiln, means mounting each kiln in axially inclined relation for rotation about said axis, with the lower ends of the kilns disposed adjacent to one another, a stationary housing common to said adjacent kiln ends and spanning and encircling the same in substantially gas-sealed relation, stationary end housings individual to the opposite ends of said kilns and enclosing the same in substantially gas-sealed relation, respectively, means individual to said end housings for feeding loose aggregate materials therethrough and into the upper ends of said kilns, respectively, a stack including blower and damper units surmounting the end housing of said ore reduction kiln, means for discharging loose aggregate materials from the lower ends of said kilns into said common housing and for discharging the same therefrom, respectively, gas inlet tubes penetrating each tubular kiln at spaced intervals therealong, and valve means individual to said tubes external to said kiln for regulating the gas flow therethrough.

References Cited by the Examiner
UNITED STATES PATENTS

| | | | |
|---|---|---|---|
| 1,358,759 | 11/20 | Larsen | 263—32 |
| 1,786,999 | 12/30 | Hornsey | 75—36 |
| 2,323,289 | 7/43 | Anderson | 263—32 |
| 2,829,042 | 4/58 | Moklebust | 75—36 |
| 2,877,108 | 3/59 | Smith | 75—36 |

DAVID L. RECK, *Primary Examiner.*

WINSTON A. DOUGLAS, *Examiner.*